April 29, 1958     J. H. BEUERLE     2,832,184
LAWN EDGER AND TRIMMER
Filed March 23, 1955
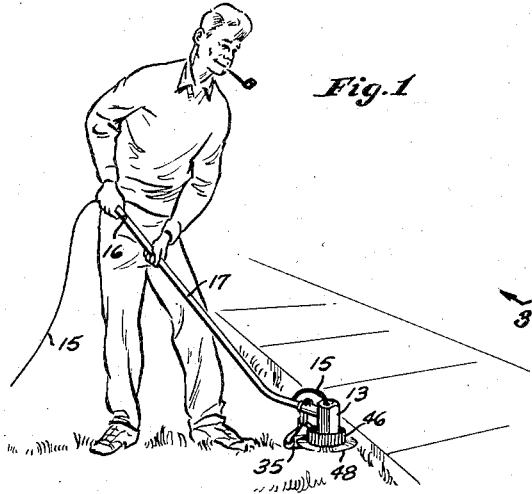
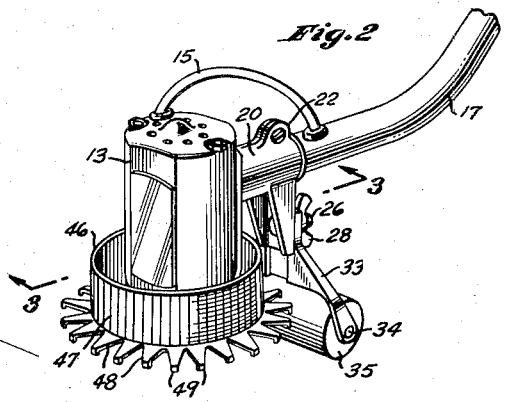
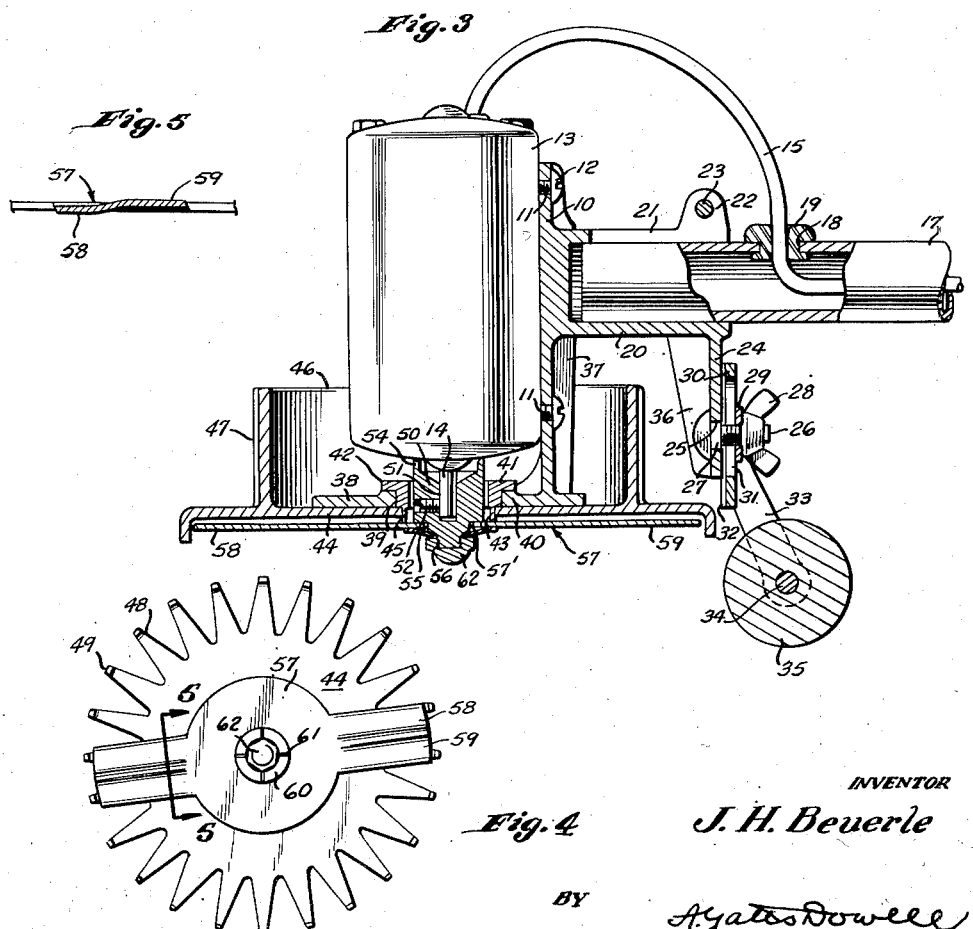
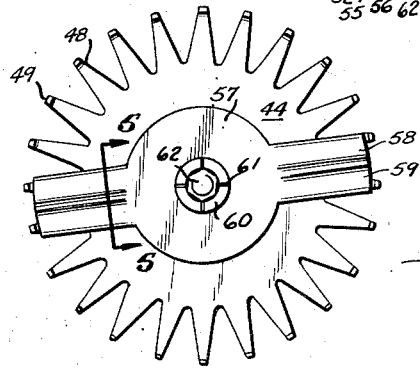
INVENTOR
J. H. Beuerle
BY
A. Yates Dowell
ATTORNEY

United States Patent Office 2,832,184
Patented Apr. 29, 1958

2,832,184

LAWN EDGER AND TRIMMER

Joseph H. Beuerle, Sayreville, N. J.

Application March 23, 1955, Serial No. 496,115

11 Claims. (Cl. 56—25.4)

This invention relates to the cultivation and care of plant life, including grass, flowers, shrubs, trees and the like and to the keeping of grounds where such are found and where it is desired to provided and maintain beauty by the presence and artistic arrangement of plant life, the cultivation and care of which involves cutting, edging and trimming.

The invention is particularly concerned with tools and equipment employed in caring for lawns, hedges, flower and other gardens and specifically to a combination power driven lawn edger, grass and shrub trimmer including a bar type cutter with a guard about the same which serves also as a roller to permit the use of the device in either of two positions one parallel and the other at right angles to the ground.

Innumerable cutting, edging and trimming devices have been produced, many of which have been power driven. These have been unsatisfactory for many reasons, including their limitations of use, clumsiness, cost, the amount of effort required in their use and they were tiring to the operator.

It is an object of the invention to overcome the disadvantages above enumerated and to provide a simple, in expensive, handy-to-use device capable of being employed for performing multiple operations with minimum effort and without making adjustments but which can be adjusted for varying the height of the cutter or length of the grass cut.

Another object of the invention is to provide a simple machine of few parts capable of being readily and easily used for cutting grass horizontally, vertically, or in any other position, as well as for trimming flowers, shrubbery, trees and other plant life.

Another object of the invention is to provide a small relatively simple and inexpensive power-driven machine in which the blade is protected by a rotatable member which also serves as a supporting wheel for the cutter when it is desired to operate the cutter from a different position, and in which the bearings also are protected from the contact with foreign matter.

A further object of the invention is to provide a powered lawn edger, grass and shrub trimmer including a handle the design, shape and angularity of which are such that the device can be operated to cut in different angular positions comfortably and conveniently without adjustment.

Another object is to provide a device which can enter the soil and cut a kerf or path without damage to the cutter as well as one having means for directing grass, shrubbery or the like to be cut into the proper position and in a manner to provide a neat cut.

A further object is to provide a device in which the bearings and the cutter are protected from foreign substances thereby reducing friction and increasing the life, and in which the edges of the cutter are offset, protecting and lengthening the life of the edger and enabling a cleaner kerf or path to be cut, thereby, as well as a cutter in which the cutting edge is spaced from the axis of rotation and a double edge is provided increasing the length of use and efficiency of the cutting mechanism.

Other objects and advantages of the invention will become apparent from the following description taken in conjunction with the accompanying drawing wherein:

Fig. 1 is a perspective illustrating one application of the invention and the use of the same;

Fig. 2, an enlarged fragmentary perspective view of the device in Fig. 1;

Fig. 3, an enlarged elevational view with parts broken away and shown in section along line 3—3 of Fig. 2;

Fig. 4, a bottom plan view of the cutter guarding and supporting wheel; and

Fig. 5, a sectional view on the line 5—5 of Fig. 4.

Briefly stated, the invention comprises a frame including a split, handle-receiving and gripping sleeve with a pair of brackets disposed transversely thereof, to one of which a ground-engaging roller is adjustably attached, and to the other of which a motor is bolted with the shaft of the motor parallel to the bracket. The lower end of the bracket to which the motor is attached is provided with a laterally disposed disk having a central opening in which is located a rotatable bearing with a combination roller and cutter guard on its lower end. A cutter is mounted beneath said cutter guard on a mounting cylinder, fixed to the motor shaft by means of a set screw, such cylinder having a reduced circular extension on which the cutter is rotatably received but the cutter is frictionally held against rotation by means of a spring clutch washer and a cap nut on the end of the mounting cylinder but which permits rotation of the cutter relative to its mounting when a foreign object is encountered.

A handle is provided with a relatively short end portion disposed at right angles to the main body thereof and said handle and the other principal parts of the device, except for the roller and the motor, are preferably of light weight material so that the entire device is relatively light weight. In order to supply current to the motor, a conductor-carrying cable extends from the motor along the interior of the handle and to a source of supply, a switch being provided near the outer end of the handle for controlling the supply of electrical energy and the operation of the motor.

With continued reference to the drawing, the invention comprises a frame member including an upright motor bracket 10 having a pair of openings 11 for screws 12 for the attachment of an electric motor 13 with a shaft 14. Current is supplied to the motor through a dual wire conductor cable 15 controlled by an operating switch 16 on a handle 17, preferably hollow, and in which the cable 15 is disposed, such cable entering the handle through an opening 18 and a wear-preventing grommet 19.

The handle 17 as well as the other principal parts of the device except the motor and the roller, preferably is of aluminum or other lightweight material and has a relatively short straight attaching end disposed at an angle of approximately 45° to the main body of the handle.

The frame is provided with a handle-receiving sleeve 20 having a split 21 and a pair of spaced clamping ears 22, one at each side of said split permitting them to be contracted by means of a bolt 23 to clamp the handle 17 within the sleeve. At its outer end and on its under side the clamping sleeve 20 is provided with a depending bracket 24 having a square opening 25 for the reception of a clamping bolt 26 having a square portion 27 of a size to be snugly received within the square opening 25 for preventing rotation of the bolt in the bracket when a wing nut 28 is rotated for clamping a washer 29 and a roller-carrying bracket 30 to the depending bracket 24. The bracket 30 has a vertical slot 31 in which the bolt 26 is located.

The outer face of the depending bracket 24 has spaced parallel flanged portions 32 which engage the depending bracket at opposite sides and prevent relative rotation between the depending bracket and the roller-supporting bracket 30. The roller-supporting bracket includes a pair of spaced arms 33 and a connecting shaft 34 on which is mounted a roller 35. Thus it is possible to adjust the distance between the roller and the handle 17 or the elevation of the horizontal cutter.

The bracket 30 is reinforced by the spaced parallel flanges 32 and in like manner, the depending bracket 24 is provided with spaced reinforcing flanges 36. Similar flanges 37 are employed to reinforce the portion of the frame to which the motor is attached.

A supporting disk 38 is integral with but at right angles to the frame and has a central opening 39 encircled by a slightly thickened hub 40 within which opening 39 is fitted a sleeve 41 having a lateral flange 42 engaging the surface of the hub 40 and with a concentric extension 43 of reduced thickness and of slightly greater internal diameter than the sleeve 41. On this extension is mounted a combination roller and cutter guard 44 having an opening snugly to receive the flange 43 and with its surface fitting snugly against the surface of the supporting disk 38, the combination roller and cutter guard 44 having a concentric roller forming flange 46 with a series of ribs 47 to provide traction for the same when used as a roller or wheel, and with a series of outwardly extending prongs 48 having laterally disposed tips 49 forming in effect a star wheel for protecting the rotary cutter.

In order to support the rotary cutter on the motor shaft 14 a cutter holder is provided in the form of a cylinder 50 having a bore 51 adapted to receive the motor shaft 14, a set screw 52 being employed for locking the cylinder to the shaft. The end of the cylinder adjacent the motor is provided with an inclined wall and an annular terminal flange 54 for excluding foreign matter.

On its opposite end the mounting cylinder 50 is provided with a shoulder 55 and a reduced threaded extremity 56. About this extremity is mounted a flat blade cutter including a central disk portion 57 with an opening 57' of a size snugly to receive the reduced end of the mounting cylinder and to engage the shoulder 55 thereof. At opposite sides of the disk 57 are cutter blades 58, 59 each one longitudinal half offset relative to the other and with the edges sharpened so that they may perform cutting operation. The disk 57 is frictionally held in position by a washer 60 having a series of slots 61 so that when a cap nut 62 is applied force will be yieldably exerted, securing the cutter in position but permitting it to yield so that it will not be broken when a rock or other foreign object is encountered.

It will be apparent from the foregoing that the present invention is a relatively small, simple, lightweight, inexpensive device of few parts, which can be employed with the blade revolving in a substantially horizontal plane to cut parallel to a surface, the elevation of the cutter being variable by adjusting the roller, and with a guard for the cutter forming a wheel which when the cutter is turned at an angle to the horizontal will serve as a roller by means of which the device can be rolled along to cut in a vertical or angular position.

The change from edging to trimming or the reverse requires no altering of the position either of the handle or adjustment between the handle and the machine. In either position the handle is at a convenient height for operation of the machine in contact with the ground and due to its light weight, it can also be used out of contact with the ground. The machine can be turned over from a trimming position to an edging position or the reverse because of the angularity of the hand and without the necessity of any adjustment.

Also, the rotating flange type star wheel serves as a propellent on surface contact as the close proximity of the rotating blade tends to drive the star wheel in the same direction, this tendency to drive the star wheel being stronger when blades of grass and weeds are frictionally engaged between the blade and the start wheel during the actual cutting operation. Due to this tendency to propel itself, an operator needs only exert a small amount of force to move the machine, resulting in almost effortless operation.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A combination grass and shrub trimmer comprising a frame, a motor attached to said frame with the shaft in upright position, an elongated handle having a relatively short portion attached to said frame and an elongated portion disposed at an angle of substantially 45° relative to said short portion, a roller carried by said frame, said roller being adjustable to vary the height of said frame, a cutter blade attached to the lower end of said motor shaft, friction means for causing said blade to rotate with said shaft permitting yielding of the blade when a foreign body is encountered, said cutter having a central disk portion with opposed cutting edges substantially parallel to the diameter of said disk whereby cutting will be limited to an area beyond said central disk portion and the longitudinal center of the cutter, a guard for said cutter rotatably mounted on said frame and having a ground-engaging roller adapted to permit the device to be rolled along the ground with the cutter at a right angle to the ground or in other angular position relative to the ground, said guard having a plurality of portions tapering to reduced laterally disposed tips providing substantially a star wheel type of guard, the device being relatively small in size and relatively light in weight whereby it can be used for cutting near the ground or in spaced relation above the ground, and means for supplying electricity to said motor along said handle and a switch adjacent the end of said handle remote from said frame for controlling the flow of electricity to said motor.

2. A combination grass and shrub trimmer comprising a frame, a motor attached to said frame with the shaft in upright position, an elongated handle having a relatively short portion attached to said frame and an elongated portion disposed at an angle of substantially 45° relative to said short portion, a roller carried by said frame, said roller being adjustable to vary the height of said frame, a cutter blade attached to the lower end of said motor shaft, friction means for causing said blade to rotate with said shaft permitting yielding of the blade when a foreign body is encountered, said cutter having a central disk portion with opposed cutting edges substantially parallel to the diameter of said disk whereby cutting will be limited to an area beyond said central disk portion and the longitudinal center of the cutter, a guard for said cutter rotatably mounted on said frame and having a ground-engaging roller adapted to permit the device to be rolled along the ground with the cutter at a right angle to the ground or in other angular position relative to the ground, said guard having a plurality of portions tapering to reduced laterally disposed tips providing substantially a star wheel type of guard, the device being relatively small in size and relatively light in weight whereby it can be used for cutting near the ground or in spaced relation above the ground.

3. A combination grass and shrub trimmer comprising a frame, a motor attached to said frame with the shaft in upright position, an elongated handle attached to said frame, a roller carried by said frame, said roller being adjustable to vary the height of said frame, a cutter blade attached to the lower end of said motor shaft, fraction means for causing said blade to rotate with said shaft permitting yielding of the blade when a foreign body is encountered, said cutter having a central disk portion with opposed cutting edges substantially parallel to the diameter of said disk whereby cutting will be limited to an area beyond said central disk portion and the longitudinal center of the cutter, a guard for said cutter rotatably mounted on said frame and having a ground-engaging roller adapted to permit the device to be rolled along the ground with the cutter at a right angle to the ground or in other angular position relative to the ground, said guard having a plurality of portions tapering to reduced laterally disposed tips providing substantially a star wheel type of guard, the device being relatively small in size and relatively light in weight whereby it can be used for cutting near the ground or in spaced relation above the ground.

4. A combination grass and shrub trimmer comprising a frame, a motor attached to said frame with the shaft in upright position, an elongated handle attached to said frame, a roller carried by said frame, said roller being adjustable to vary the height of said frame, a cutter blade attached to the lower end of said motor shaft, friction means for causing said blade to rotate with said shaft permitting yielding of the blade when a foreign body is encountered, a guard for said cutter rotatably mounted on said frame and having a ground-engaging roller adapted to permit the device to be rolled along the ground with the cutter at a right angle to the ground or in other angular position relative to the ground, said guard having a plurality of portions tapering to reduced laterally disposed tips providing substantially a star wheel type of guard, the device being relatively small in size and relatively light in weight whereby it can be used for cutting near the ground or in spaced relation above the ground.

5. A combination grass and shrub trimmer comprising a frame, a motor attached to said frame with the shaft in upright position, an elongated handle attached to said frame, a roller carried by said frame, said roller being adjustable to vary the height of said frame, a cutter blade attached to the lower end of said motor shaft, friction means for causing said blade to rotate with said shaft permitting yielding of the blade when a foreign body is encountered, a guard for said cutter rotatably mounted on said frame and having a ground-engaging roller adapted to permit the device to be rolled along the ground with the cutter at a right angle to the ground or in other angular position relative to the ground, the device being relatively small in size and relatively light in weight whereby it can be used for cutting near the ground or in spaced relation above the ground.

6. A combination grass and shrub trimmer comprising a frame, a motor attached to said frame with the shaft in upright position, an elongated handle attached to said frame, a roller carried by said frame, said roller being adjustable to vary the height of said frame, a cutter blade attached to the lower end of said motor shaft, friction means for causing said blade to rotate with said shaft permitting yielding of the blade when a foreign body is encountered, a guard for said cutter rotatably mounted on said frame and having a ground-engaging roller adapted to permit the device to be rolled along the ground with the cutter at a right angle to the ground or in other angular position relative to the ground.

7. A combination grass and shrub trimmer including a frame, a motor supported on said frame with a shaft in upright position, a handle attached to said frame for moving the same, a cutter blade on the lower end of said motor shaft, a guard for said cutter having a ground-engaging, wheel-forming portion adapted to support said blade so that it may be operated in horizontal position or at right angles thereto.

8. A combination edger and grass and shrub trimmer comprising a frame, an adjustably mounted roller for supporting said frame in upright position, a second roller rotatably carried in said frame at right angles to the first roller for supporting said frame substantially on its side, said second roller having a star wheel guard, a cutter protected by said guard, and a motor supported on said frame and connected to drive said cutter.

9. A combination lawn trimmer and edger comprising a frame having a motor mounted thereon driving a rotary cutter blade, a handle attached to said frame, a blade guard rotatably mounted in close proximity to said blade, said guard having a ground-engaging, wheel-forming portion adapted to support said frame in cutting position, said rotary blade exerting enough rotary force on said guard to propel it along the ground.

10. A combination grass and shrub trimmer including a frame, a motor supported on said frame and arranged to have its shaft in an upright position, a handle attached to said frame for manipulating the trimmer, a cutter blade mounted on the lower end of the motor shaft, a guard for said cutter located between said frame and said cutter and rotatably mounted on said frame independently of the motor shaft, said guard having portions extending outwardly of said cutter whereby an obstruction will first contact said guard before it can contact said cutter blade, a ground engaging roller mounted on said frame and adapted to support said cutter in a definite spaced relation to the ground, said guard having a drum shaped reinforcing rib projecting in a direction away from said cutter blade whereby the trimmer may be guided over the ground by the drum shaped rim engaging the ground for supporting said cutter blade in a horizontal position.

11. A trimming device comprising a frame, a cutter element with radial blades mounted for rotation on said frame, a toothed guarding disk of greater diameter than said cutter element freely rotatably mounted on said frame, and closely adjacent said cutter element, laterally extending tips on said teeth extending across the plane of said cutter element and outwardly of the circumference of the path thereof thereby preventing contact of the cutter element with a surface, and power means to rotate said cutter element whereby a shearing type action may take place between said cutter element and said guarding disk.

References Cited in the file of this patent
UNITED STATES PATENTS

| | | |
|---|---|---|
| 773,095 | Olson | Oct. 25, 1904 |
| 2,515,732 | Parry | July 18, 1950 |
| 2,608,043 | Berdan | Aug. 26, 1952 |
| 2,618,919 | Hutchens | Nov. 25, 1952 |
| 2,630,665 | Lauer | Mar. 10, 1953 |
| 2,660,847 | Britten | Dec. 1, 1953 |